United States Patent
Shirasawa et al.

(10) Patent No.: US 11,137,277 B2
(45) Date of Patent: Oct. 5, 2021

(54) GAS METER

(71) Applicant: Panasonic Intellectual Property Management Co., Ltd., Osaka (JP)

(72) Inventors: Tadanori Shirasawa, Nara (JP); Nobuaki Murabayashi, Osaka (JP); Yoshikuni Tamura, Osaka (JP); Kazuki Shiota, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 153 days.

(21) Appl. No.: 16/603,680

(22) PCT Filed: Jun. 11, 2018

(86) PCT No.: PCT/JP2018/022143
§ 371 (c)(1),
(2) Date: Oct. 8, 2019

(87) PCT Pub. No.: WO2018/235644
PCT Pub. Date: Dec. 27, 2018

(65) Prior Publication Data
US 2020/0116541 A1    Apr. 16, 2020

(30) Foreign Application Priority Data

Jun. 19, 2017 (JP) .............................. JP2017-119224

(51) Int. Cl.
*G01F 15/06* (2006.01)
*G01K 13/00* (2021.01)

(52) U.S. Cl.
CPC ............. *G01F 15/06* (2013.01); *G01K 13/00* (2013.01)

(58) Field of Classification Search
CPC ............................... G01F 15/06; G01K 13/00
See application file for complete search history.

(56) References Cited

U.S. PATENT DOCUMENTS

2008/0282817 A1* 11/2008 Breed .................. G06F 3/0238
73/865.9
2010/0326548 A1* 12/2010 Miyata ..................... G07C 3/00
137/561 R (Continued)

FOREIGN PATENT DOCUMENTS

EP    2 177 884    4/2010
EP    2 258 985    12/2010

(Continued)

OTHER PUBLICATIONS

Machine translation of JP2007024811 (Year: 2007).*

(Continued)

*Primary Examiner* — David J Bolduc
(74) *Attorney, Agent, or Firm* — Wenderoth, Lind & Ponack, L.L.P.

(57) ABSTRACT

A gas meter includes flow rate measurer that measures a flow rate of gas in time series and storage unit that stores the flow rate measured by flow rate measurer as flow rate data. The gas meter also includes storage condition setting unit that determines a condition for storing the flow rate data in storage unit and communication unit that communicates with center device. Storage unit stores the flow rate data to satisfy the condition set by storage condition setting unit.

6 Claims, 4 Drawing Sheets

(56) References Cited

U.S. PATENT DOCUMENTS

| | | | |
|---|---|---|---|
| 2011/0000310 A1 | 1/2011 | Yokohata et al. | |
| 2011/0012738 A1* | 1/2011 | Nakamura | G06Q 10/06 |
| | | | 340/632 |
| 2016/0335875 A1* | 11/2016 | Alcorn | G01F 25/0007 |
| 2018/0112872 A1* | 4/2018 | Hishinuma | F23N 5/00 |

FOREIGN PATENT DOCUMENTS

| | | |
|---|---|---|
| JP | 2001-241643 | 9/2001 |
| JP | 2007-24811 | 2/2007 |
| JP | 2007-199002 | 8/2007 |
| JP | 2008-215905 | 9/2008 |
| JP | 5269442 B | 8/2013 |

OTHER PUBLICATIONS

Extended European Search Report dated May 20, 2020 in related European Patent Application No. 18821196.5.
English Translation of Search Report dated Jul. 9, 2020 in corresponding Chinese Patent Application No. 201880033481.2.
International Search Report of PCT application No. PCT/JP2018/022143 dated Jul. 10, 2018.

* cited by examiner

SHUT OFF DUE TO EXCEEDING CONTINUOUS USAGE TIME

| CONDITION | TRIGGER CONDITION | Tp | Tf |
|---|---|---|---|
| 1 | DETECTION OF OPERATION OF APPLIANCES | 2.5 SEC | 7.5 SEC |
| 2 | DETECTION OF EXCEEDING MAXIMUM FLOW RATE | 6.5 SEC | 3.5 SEC |
| 3 | DETECTION OF EXCEEDING MAXIMUM USAGE TIME | 6.5 SEC | 3.5 SEC |

GAS METER

CROSS-REFERENCE TO RELATED APPLICATIONS

This application is a U.S. national stage application of the PCT International Application No. PCT/JP2018/022143 filed on Jun. 11, 2018, which claims the benefit of foreign priority of Japanese patent application No. 2017-119224 filed on Jun. 19, 2017, the contents all of which are incorporated herein by reference.

TECHNICAL FIELD

The present invention relates to a gas meter that measures a flow rate of gas, and in particular, to a gas meter that has a function of transmitting measurement data to a center.

BACKGROUND ART

This type of gas meter has conventionally accumulated flow rate data periodically measured and transmitted the flow rate data to a center at a time managed by a timer or in response to a trigger from the center. The center then has determined the type of a gas appliance based on the flow rate data received (see Patent Literature (PTL 1, for example).

FIG. 7 is a configuration diagram of a gas appliance determination device disclosed in PTL 1. As illustrated in FIG. 7, the gas appliance determination device is constituted by gas meter 101 and information processing terminal 102. Gas meter 101 includes a flow rate measurer that measures the flow rate of gas and a communication unit that transmits flow rate value information output from the flow rate measurer (both are not illustrated). Information processing terminal 102 is configured to receive the flow rate value information from the communication unit and determine the gas appliance being used.

Information processing terminal 102 determines the gas appliance using software with algorithms for determining an appliance. It is thus possible to determine the appliance while changes in hardware specifications of gas meter 101 are minimized.

CITATION LIST

Patent Literature

PTL 1: Unexamined Japanese Patent Publication No. 2007-199002

SUMMARY OF THE INVENTION

In a conventional configuration, however, gas meter 101 stores the flow rate periodically measured as flow rate data. For this reason, a method of reducing the amount of data to be stored by compressing the data and power required for communication has also been disclosed. However, the gas meter still requires a large storage capacity even though the data compression is performed and large power for communication, and is presupposed to be driven by batteries. Consequently, it is necessary for the gas meter to have a large battery capacity, which leads to an increase in size.

The present invention provides a gas meter that can further reduce the amount of data to be stored by limiting the amount of data to be transmitted to required data and power required for communication accordingly.

A gas meter according to the present invention includes a flow rate measurer that measures a flow rate of gas in time series and a storage unit that stores the flow rate measured by the flow rate measurer as flow rate data. The gas meter also includes a storage condition setting unit that sets a condition for storing the flow rate data in the storage unit and a communication unit that communicates with a center device. The storage unit stores the flow rate data to satisfy the condition set by the storage condition setting unit, and based on a data request from the center device, the communication unit transmits the flow rate data stored in the storage unit to the center device.

Only the flow rate data set by the storage condition setting unit is stored, and thus the amount of flow rate data that needs to be stored can be significantly reduced and power consumption for transmitting the flow rate data can also be reduced. As a result, in a gas meter presupposed to be driven by batteries, it is possible to prevent the capacity of the batteries from increasing and achieve various kinds of information from analysis of the flow rate of gas such as a determination of an appliance by cooperating with a center without increasing the size of the gas meter.

The present invention provides a gas meter that can reduce the capacity of a memory and power required for communication by limiting the amount of data to be transmitted to required data.

DESCRIPTION OF EMBODIMENTS

Hereinafter, exemplary embodiments of the present invention will be described with reference to the drawings. It is to be noted that the present invention is not limited to these exemplary embodiments.

First Exemplary Embodiment

Figure 1:
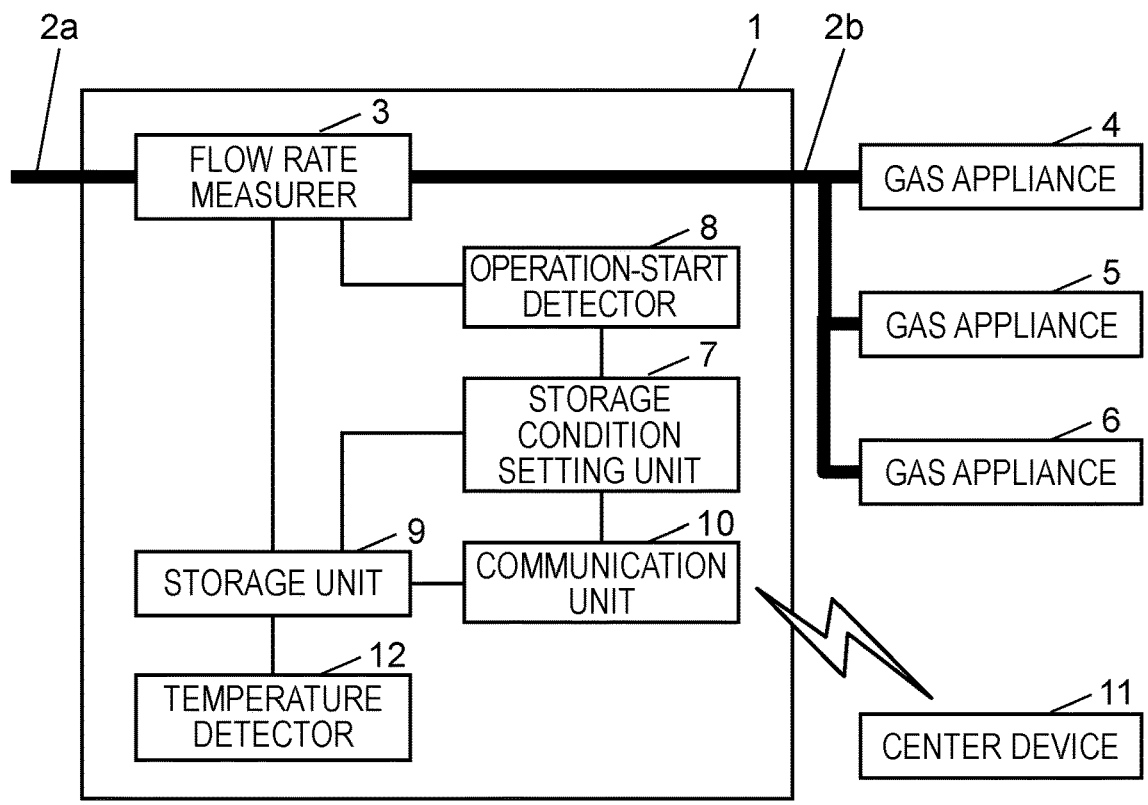
FIG. 1 is a block diagram of a gas meter according to a first exemplary embodiment of the present invention.

FIG. 1 is a block diagram of a gas meter according to a first exemplary embodiment of the present invention.

Referring to FIG. 1, gas meter 1 has gas inlet pipe 2a and gas outlet pipe 2b, and flow rate measurer 3 is disposed in a path between inlet pipe 2a and outlet pipe 2b. A plurality of gas appliances 4, 5, and 6 are connected to a downstream side of outlet pipe 2b.

Flow rate measurer 3 detects the flow rate of gas in time series and outputs the flow rate detected. Flow rate measurer 3 measures an instantaneous flow rate at a predetermined interval (for example, every 0.5 seconds). Storage unit 9 stores flow rate data measured by flow rate measurer 3 based on conditions set by storage condition setting unit 7.

Operation-start detector 8 determines that the flow rate of gas measured by flow rate measurer 3 has increased by a predetermined flow rate (for example, 51.82 L/h) to detect that any of gas appliances 4 to 6 starts to operate, and outputs an operation start signal of the gas appliance.

Storage condition setting unit 7 sets a condition for flow rate data to be stored in storage unit 9. In this case, the flow rate data to be stored is specified as flow rate data obtained during predetermined periods of time before and after a start point when operation-start detector 8 detects that a gas appliance has started to operate.

Storage unit 9 has a storage capacity to store the flow rate of gas measured by flow rate measurer 3 as flow rate data for a predetermined time. Storage unit 9 sequentially stores the flow rate data and if the flow rate data exceeds the storage capacity, successively overwrites the flow rate data to store the latest flow rate data. When an operation start signal of a gas appliance is output from operation-start detector 8, based on the condition set by storage condition setting unit 7, storage unit 9 holds the flow rate data in the past measured during the predetermined period of time before the start point when operation-start detector 8 detects that the gas appliance has started to operate and the flow rate data measured during the predetermined period of time after the start point.

Figure 2:
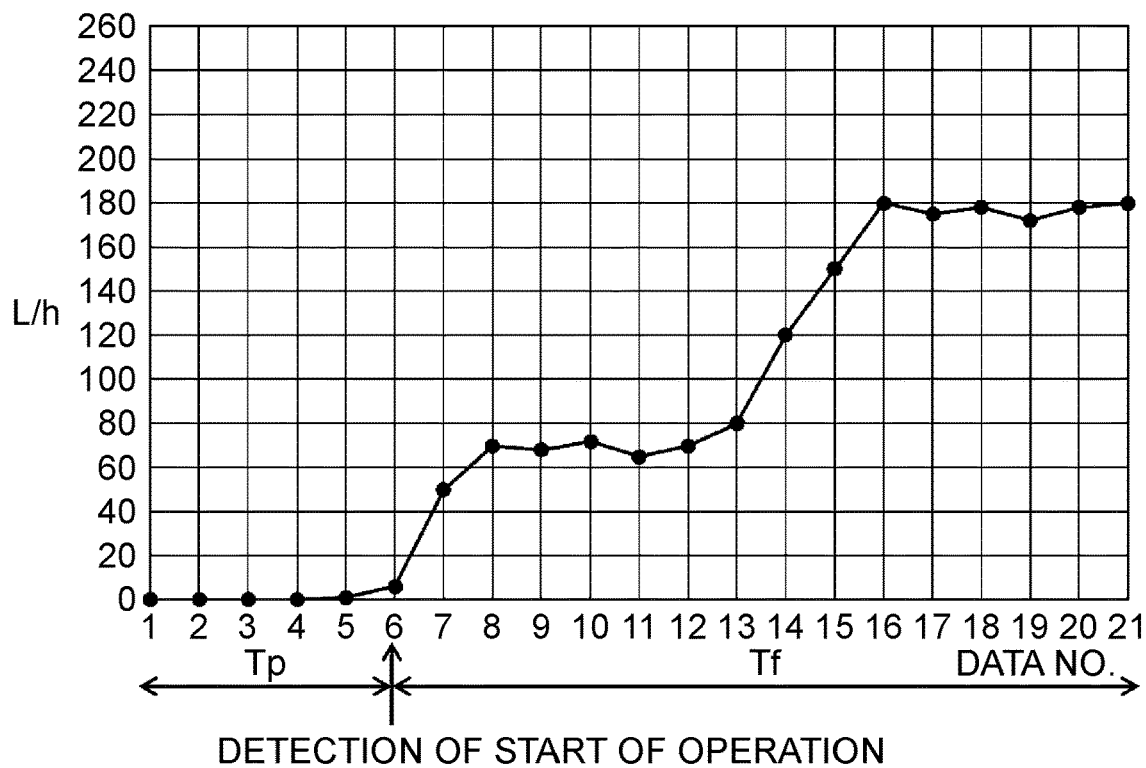
FIG. 2 is a graph illustrating an operation of the gas meter according to the first exemplary embodiment of the present invention.

FIG. 2 is a graph illustrating an example of a measurement timing of flow rate measurer 3 and flow rate data measured in a case where the gas appliance is a gas fan heater. The graph illustrates a relationship between a timing of outputting an operation start signal from operation-start detector 8 and flow rate data to be stored in storage unit 9. A black dot indicates flow rate data measured by flow rate measurer 3 every 0.5 seconds.

In the present exemplary embodiment, based on a condition set by storage condition setting unit 7, 5 pieces (Data Nos. 1 to 5) of flow rate data measured during predetermined period of time Tp in the past before a start point (Data No. 6) when the operation start signal is output and 16 pieces (Data Nos. 6 to 21) of flow rate data measured during predetermined period of time Tf after the start point are stored and held in storage unit 9.

When communication unit 10 receives a signal to request the flow rate data from center device 11, among the flow rate data stored in storage unit 9, the flow rate data measured during predetermined periods of time Tp and Tf is transmitted to center device 11. In transmitting the flow rate data, it is needless to mention that the serial number of gas meter 1 and the time when the flow rate data was measured are also transmitted as additional data.

Center device 11 is used to perform various analyses based on the flow rate data received. For example, by specifying a gas appliance based on a flow rate pattern at the start of operation, it is possible to recognize a gas appliance used in a house where a gas meter is installed. Moreover, by comparing flow rate data to the flow rate data in the past, it is possible to analyze the state of degradation of the gas appliance.

Every time it is detected that one gas appliance has started, storage unit 9 stores flow rate data. In addition, every time an operation start signal is output, storage unit 9 stores a predetermined number of pieces of the flow rate data as one data set. Storage unit 9 is configured to transmit a plurality of data sets at the same time. As the frequency of communication decreases, power required for communication can be reduced.

Gas meter 1 also includes temperature detector 12 that detects the temperature of gas or the air temperature of a location where gas meter 1 is installed. By transmitting not only flow rate data but also temperature data when the flow rate data is stored in storage unit 9 to center device 11, it is possible to improve the accuracy of various analyses in center device 11.

For example, the heater appliance such as a gas fan heater functioning as a gas appliance has a combustion amount at the start of operation that varies depending on the room temperature. That is, the gas flow rate pattern varies depending on the room temperature. By determining an appliance reflecting the room temperature obtained by estimating the air temperature based on the temperature detected by the gas meter, the accuracy of the determination is improved.

One of security functions of the gas meter is to shut off gas when the flow rate of gas exceeds the maximum flow rate. The gas meter learns the maximum flow rate based on the environment in which the gas meter is installed. That is to say, in view of securing the safety of the gas meter, the gas meter learns the maximum flow rate that is possible in an actual usage situation from the maximum flow rate assumed as an initial value to reduce the maximum flow rate. As a result, the gas meter can quickly determine an abnormality.

However, when the gas meter learns the maximum flow rate during a period of time with high air temperature, the maximum flow rate learned is low. If the air temperature suddenly drops at a change of seasons and thus the combustion amount increases, the maximum flow rate possibly exceeds the maximum flow rate learned. Such a state is determined as an abnormality and gas may be shut off.

Consequently, it is conceivable of analyzing a transition of the air temperature and the maximum flow rate and setting a setting value of the maximum flow rate to an optimal value. However, if such a process is performed only by the gas meter 1, the process becomes complicated and a large burden is imposed on a microcomputer that executes control and power consumption increases accordingly, which is not preferable.

In the present exemplary embodiment, gas meter 1 is used. Only in a case of a gas appliance such as a gas hot water supply in which the gas consumption is large and the maximum flow rate varies depending on the air temperature, storage condition setting unit 7 causes storage unit 9 to store flow rate data at the start of operation and temperature data, and these pieces of data are transmitted to center device 11. Center device 11 can thus observe the transition of the maximum gas consumption along with the change in air temperature and in some cases, cause gas meter 1 to change the setting value of the maximum flow rate. It is thus possible to prevent unnecessary shut off of gas.

As described above, according to the present exemplary embodiment, the flow rate data to be accumulated is specified to minimize the storage capacity. In addition, as the flow rate data required is transmitted to the center at a time, power consumption required for communication can be reduced.

Center device 11 determines an appliance based on the flow rate data received from gas meter 1. Consequently, it is possible to recognize what appliance is used and detect the abnormality and the state of degradation of a gas appliance by continuously accumulating the flow rate data and comparing the flow rate data.

In the first exemplary embodiment, the storage condition set by storage condition setting unit 7 is a predetermined period of time based on an operation start signal from operation-start detector 8, during which flow rate data is held. However, the storage condition of the present invention is not limited to the storage condition described above. A specific period of time in a day or a specific period of time on a specific day of the week may be specified and the usage state of gas meter 1 during that period of time may be analyzed in center device 11.

The condition set by storage condition setting unit 7 may be specified by center device 11 according to a purpose of analysis in center device 11.

Second Exemplary Embodiment

Figure 3:
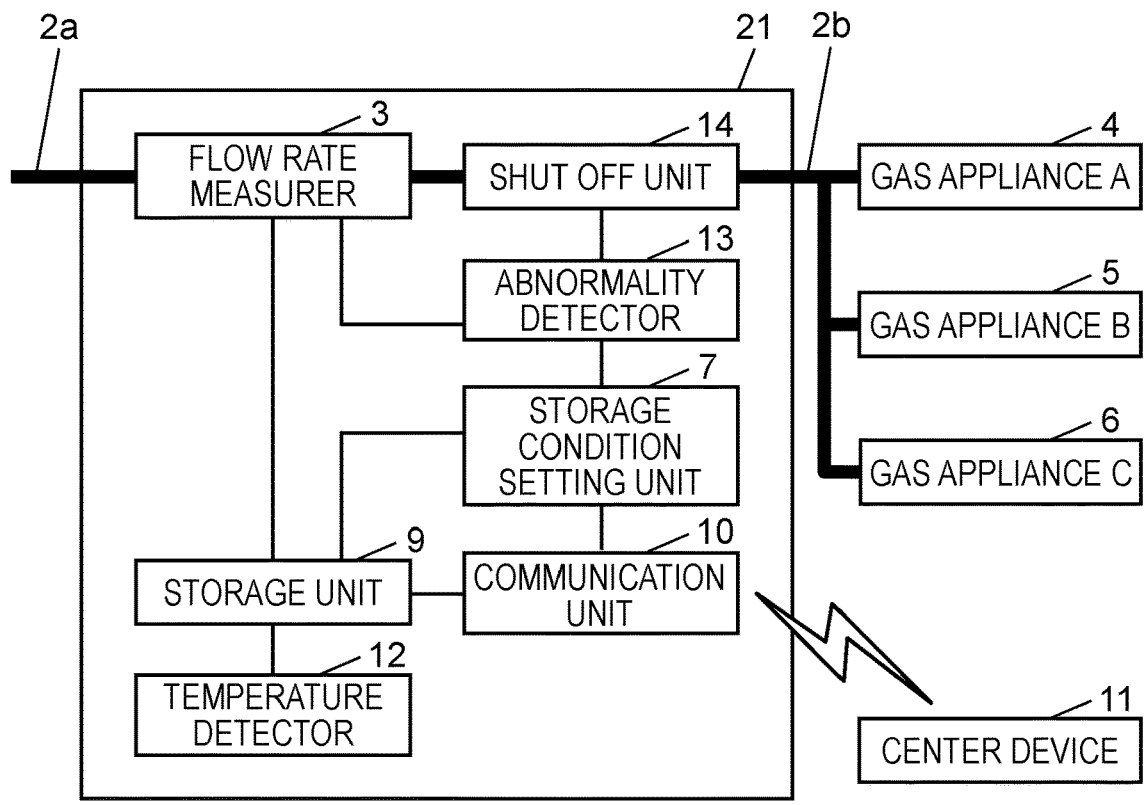
FIG. 3 is a block diagram of a gas meter according to a second exemplary embodiment of the present invention.

FIG. 3 is a block diagram of gas meter 21 according to a second exemplary embodiment. The second exemplary embodiment is different from the first exemplary embodiment in that abnormality detector 13 is included instead of operation-start detector 8 illustrated in FIG. 1 and shut off unit 14 is further included. The same reference numerals are given to the same configurations as those of the first exemplary embodiment, and a description thereof will be omitted.

Figure 4:
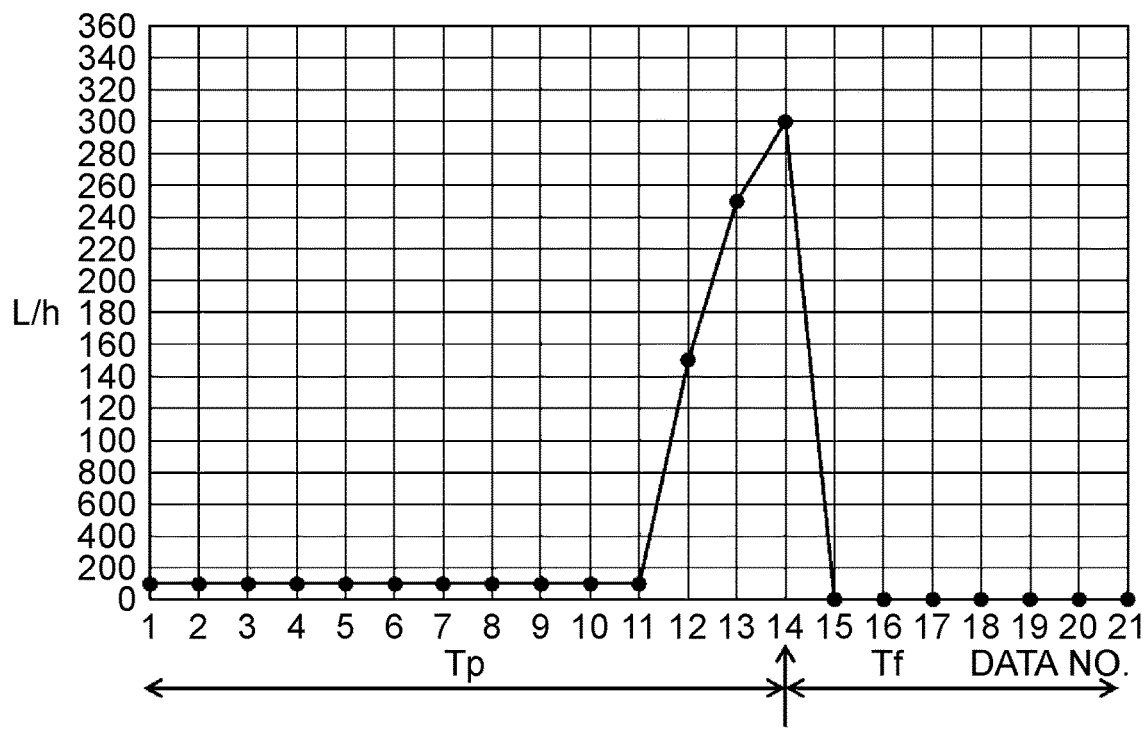
FIG. 4 is a graph illustrating an operation of the gas meter according to the second exemplary embodiment of the present invention.
Figures 5, 6:
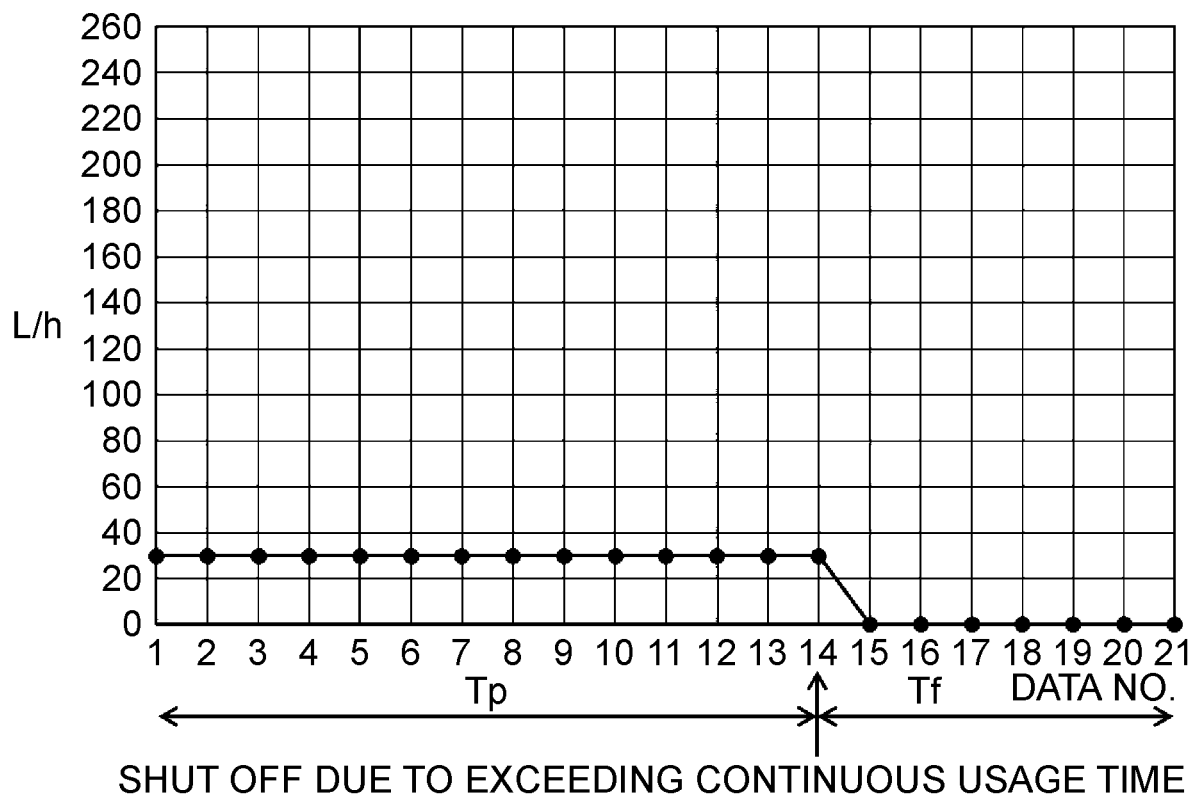
FIG. 5 is a graph illustrating another operation of the gas meter according to the second exemplary embodiment of the present invention.
FIG. 6 illustrates an example of setting contents of a storage condition setting unit in the gas meter according to the first exemplary embodiment of the present invention.
Figure 7:
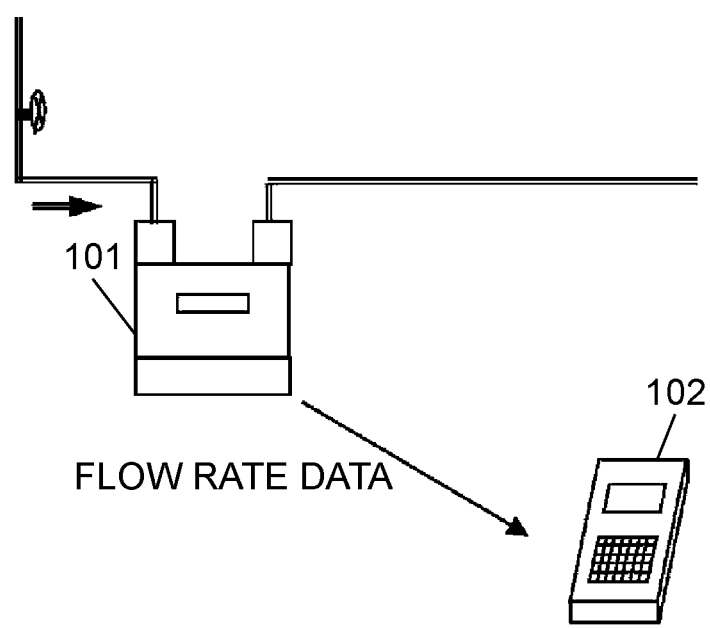
FIG. 7 is a configuration diagram of a conventional gas meter.

FIGS. 4 and 5 are timing charts illustrating a relationship between a measurement timing of flow rate measurer 3, a timing when abnormality detector 13 detects an abnormality and shut off unit 14 shuts off gas, and flow rate data stored in storage unit 9. A black dot in FIGS. 4 and 5 indicates flow rate data measured by flow rate measurer 3 every 0.5 seconds. FIG. 4 illustrates an example of shut off due to exceeding a maximum flow rate, which is caused by a gas hose being disconnected. FIG. 5 illustrates an example of shut off due to exceeding a continuous usage time, which is caused by a gas stove being forgotten to be turned off.

Abnormality detector 13 detects an abnormality based on the flow rate measured by flow rate measurer 3. When an abnormality is detected, shut off unit 14 shuts off gas to stop supplying gas to a downstream side of a gas meter.

An example of the abnormality detected by abnormality detector 13 is a long usage abnormality due to a gas appliance being forgotten to be turned off, where gas is continuously used over a usage time set in each gas flow rate range. In addition, the abnormality includes a maximum flow rate abnormality in which a large amount of gas exceeding a predetermined assumed value of the gas flow rate flows because a gas hose is disconnected from a gas appliance and a case where gas has to be shut off due to an earthquake of a predetermined magnitude or larger.

Storage unit 9 has a storage capacity to store the flow rate of gas measured by flow rate measurer 3 as flow rate data for a predetermined period of time. Storage unit 9 sequentially stores the flow rate data. When abnormality detector 13 detects an abnormality and shut off unit 14 shuts off gas, several pieces (Data Nos. 1 to 13 in FIG. 4) of flow rate data measured during predetermined period of time Tp in the past before a start point when gas is shut off and several pieces (Data Nos. 14 to 21) of flow rate data measured during predetermined period of time Tf after the start point are stored and held in storage unit 9. Storage unit 9 also holds a reason why abnormality detector 13 has determined to shut off gas and temperature data detected by temperature detector 12.

In response to a request signal from center device 11, communication unit 10 transmits the flow rate data and the reason why gas is shut off that are stored in storage unit 9. By analyzing gas flow rate data at the occurrence of the abnormality, center device 11 can recognize the situation of occurrence.

For example, in a case of an abnormality that leads to shut off due to exceeding the maximum flow rate as illustrated in FIG. 4, it is possible to recognize the situation of occurrence as follows. That is to say, in the shut off due to exceeding the maximum flow rate, when the start of a change in gas flow rate is sharp, it is determined as a serious abnormality such as a gas hose being disconnected from a gas appliance or a damage of a pipe. On the other hand, when the change in flow rate is not sharp and exceeds the maximum flow rate following the start of the change in a case of normal combustion, it is determined that the water temperature drops according to a temporal decrease in air temperature at a change of seasons, the combustion amount of a hot water supply rapidly increases and thus the flow rate exceeds the maximum flow rate.

In this determination, it is needless to mention that the accuracy of determination is improved by using the temperature data detected by temperature detector 12.

Alternatively, as illustrated in FIG. 5, when gas is shut off by long time usage in the flow rate range of a low heat at a gas stove, the following is possible. That is to say, as center device 11 can estimate the cause of the shut off by analysis, it is possible to notify a user about the cause, that is, advise a user how to use a gas appliance. When it is estimated that gas is shut off simply by the gas stove being used for a long time, it is determined as normal usage. Center device 11 causes gas meter 21 to automatically extend the usage time.

FIG. 6 illustrates storage conditions set by storage condition setting unit 7. As illustrated in FIG. 6, according to the first exemplary embodiment, the predetermined period of time Tf after detecting the start of operation is long for the purpose of obtaining flow rate data required to determine an appliance, as described in condition A. However, in detecting an abnormality, as the cause of the abnormality detection needs to be analyzed, predetermined period of time Tp before detecting the abnormality is increased as described in conditions B and C, so that flow rate data required is stored. Predetermined periods of time Tp and Tf during which the flow rate data is stored may be determined by the cause of the abnormality.

The exemplary embodiments of the present invention have been described above. The description of the exemplary embodiments is illustrative and not restrictive of the present invention. In addition, exemplary embodiments can also be achieved by combining the respective constituent elements described in the above exemplary embodiments. The present invention may make various modifications, replacements, additions, and omission within the scope of the claims or equivalents of such scope.

As described above, a gas meter according to a first disclosure includes a flow rate measurer that measures a flow rate of gas in time series, a storage unit that stores the flow rate measured by the flow rate measurer as flow rate data, a storage condition setting unit that sets a condition for storing the flow rate data in the storage unit, and a communication unit that communicates with a center device. The storage unit stores the flow rate data to satisfy the condition set by the storage condition setting unit, and based on a data request from the center device, the communication unit transmits the flow rate data stored in the storage unit to the center device.

In this configuration, only the flow rate data set by the storage condition setting unit is stored, and thus the amount of flow rate data that needs to be stored can be significantly reduced and power consumption for transmitting the flow rate data can also be reduced. As a result, in a gas meter presupposed to be driven by batteries, it is possible to prevent the capacity of the batteries from increasing and achieve various kinds of information from analysis of the flow rate of gas such as a determination of an appliance by cooperating with a center without increasing the size of the gas meter.

A gas meter according to a second disclosure further includes, particularly in the first disclosure, an operation-start detector that detects start of operation of a gas appliance based on the flow rate measured by the flow rate measurer. The storage condition setting unit may set, as the condition, a time period during which the flow rate of the flow rate data to be stored in the storage unit is to be measured by the flow rate measurer to one of (i) a predetermined time period counted from the start of the operation detected by the operation-start detector and (ii) a predetermined time period retroactively counted from the start.

According to a gas meter of a third disclosure, particularly in the first disclosure, the storage condition setting unit may determine a period of time during which the storage unit stores the flow rate data as a predetermined period of time in a day.

According to a gas meter of a fourth disclosure, particularly in the first disclosure, the storage condition setting unit may determine a period of time during which the storage unit stores the flow rate data as a predetermined period of time on a specific day of a week.

A gas meter according to a fifth disclosure further includes, particularly in the first disclosure, an abnormality determination unit that determines an abnormality based on the flow rate measured by the flow rate measurer. The storage condition setting unit may set, as the condition, a time period during which the flow rate of the flow rate data to be stored in the storage unit is to be measured by the flow rate measurer to a predetermined time period retroactively counted from the start of the abnormality determined by the abnormality determination unit.

According to a gas meter of a sixth disclosure, particularly in any one of the first to fifth disclosures, the storage condition setting unit may set a condition for storing the flow rate data in the storage unit based on a condition specified by the center device.

A gas meter according to a seventh disclosure further includes, particularly in any one of the first to sixth disclosures, a temperature detector, and temperature data may be transmitted together with the flow rate data.

INDUSTRIAL APPLICABILITY

As described above, the gas meter of the present invention can store data required for analysis such as flow rate data while achieving power saving and transmit the data to a center device. Consequently, the gas meter according to the present invention is applicable to not only a domestic gas meter but also an industrial gas meter.

REFERENCE MARKS IN THE DRAWINGS 1, 21: gas meter
3: flow rate measurer
7: storage condition setting unit
8: operation-start detector
9: storage unit
10: communication unit
11: center device
12: temperature detector
13: abnormality detector

The invention claimed is:

1. A gas meter comprising:
a flow rate measurer that measures a flow rate of gas in time series;
a storage unit that stores the flow rate measured by the flow rate measurer as flow rate data;
a storage condition setting unit that sets a condition for storing the flow rate data in the storage unit;
a communication unit that communicates with a center device; and
an operation-start detector that detects an operation-start of a gas appliance by the flow rate of gas measured by the flow rate measurer and outputs an operation-start signal, wherein
the storage unit stores the flow rate data to satisfy the condition set by the storage condition setting unit, and based on a data request from the center device, the communication unit transmits the flow rate data stored in the storage unit to the center device,
the storage unit holds flow rate data in a past measured during a predetermined period of time before the operation-start and flow rate data measured during a predetermined period of time after the operation-start, when the operation-start detector outputs the operation-start signal,
the storage unit stores the flow rate data every time the operation-start detector outputs the operation-start signal,
the storage unit stores a predetermined number of pieces of the flow rate data as one data set, and
the storage unit is configured to transmit a plurality of the data sets at a same time.

2. The gas meter according to claim 1, wherein the storage condition setting unit determines a period of time during which the storage unit stores the flow rate data, as a predetermined period of time in a day.

3. The gas meter according to claim 1, wherein the storage condition setting unit determines a period of time during which the storage unit stores the flow rate data, as a predetermined period of time on a specific day of a week.

4. The gas meter according to claim 1, further comprising an abnormality determination unit that determines an abnormality based on the flow rate measured by the flow rate measurer,
wherein the storage condition setting unit sets, as the condition, a time period during which the flow rate of the flow rate data to be stored in the storage unit is to be measured by the flow rate measurer to a predetermined time period retroactively counted from the start of the abnormality determined by the abnormality determination unit.

5. The gas meter according to claim 1, wherein the storage condition setting unit sets the condition for storing the flow rate data in the storage unit based on a condition specified by the center device.

6. The gas meter according to claim 1, further comprising a temperature detector,
wherein the communication unit transmits temperature data together with the flow rate data.

* * * * *